(12) United States Patent
Musgrave et al.

(10) Patent No.: US 7,473,750 B2
(45) Date of Patent: *Jan. 6, 2009

(54) RANDOM COPOLYMERS AND FORMULATIONS USEFUL FOR THERMOFORMING AND BLOW MOLDING APPLICATIONS

(75) Inventors: Mike Musgrave, Houston, TX (US); Lu Ann Kelly, Friendswood, TX (US); Mark Murphy, Baytown, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/295,378

(22) Filed: Dec. 6, 2005

(65) Prior Publication Data

US 2006/0189749 A1 Aug. 24, 2006

Related U.S. Application Data

(60) Provisional application No. 60/633,789, filed on Dec. 7, 2004.

(51) Int. Cl.
C08F 210/16 (2006.01)

(52) U.S. Cl. ...................... 526/348; 528/396

(58) Field of Classification Search .......... 526/348, 526/351, 352, 160, 170; 524/583, 584, 366, 524/588; 528/396
See application file for complete search history.

(56) References Cited

U.S. PATENT DOCUMENTS

| | | | |
|---|---|---|---|
| 4,048,409 A * | 9/1977 | Sugita et al. ............. 524/287 |
| 4,271,060 A | 6/1981 | Hubby ................. 260/33.6 A |
| 4,448,901 A * | 5/1984 | Senda et al. ............... 521/60 |
| 4,543,399 A | 9/1985 | Jenkins, III et al. .......... 526/70 |
| 4,588,790 A | 5/1986 | Jenkins, III et al. .......... 526/70 |
| 4,704,421 A * | 11/1987 | Teskin ..................... 524/287 |
| 4,769,418 A * | 9/1988 | Mizuno et al. ............. 525/106 |
| 5,001,205 A | 3/1991 | Hoel ..................... 525/128 |
| 5,026,798 A | 6/1991 | Canich ................... 526/127 |
| 5,028,670 A | 7/1991 | Chinh et al. ................ 526/73 |
| 5,236,998 A | 8/1993 | Lundeen et al. ............. 525/52 |
| 5,317,036 A | 5/1994 | Brady, III et al. .......... 523/223 |
| 5,352,749 A | 10/1994 | DeChellis et al. ............ 526/68 |
| 5,405,922 A | 4/1995 | DeChellis et al. ............ 526/68 |
| 5,436,304 A | 7/1995 | Griffin et al. ............... 526/68 |
| 5,462,999 A | 10/1995 | Griffin et al. ............... 526/68 |
| 5,525,678 A | 6/1996 | Mink et al. ............... 525/246 |
| 5,589,555 A | 12/1996 | Zboril et al. ............... 526/64 |
| 5,616,661 A | 4/1997 | Eisinger et al. .............. 526/88 |
| 5,627,242 A | 5/1997 | Jacobsen et al. ............. 526/60 |
| 5,643,847 A | 7/1997 | Walzer ................... 502/117 |
| 5,665,818 A | 9/1997 | Tilston et al. ............... 525/53 |
| 5,668,228 A | 9/1997 | Chinh et al. ............... 526/67 |
| 5,677,375 A | 10/1997 | Rifi et al. .................. 525/53 |
| 5,703,187 A | 12/1997 | Timmers .................. 526/282 |
| 5,747,406 A | 5/1998 | Reichle et al. ............. 502/117 |
| 5,880,198 A * | 3/1999 | Kobayashi et al. .......... 524/451 |
| 6,069,213 A | 5/2000 | Nemzek et al. ............. 526/113 |
| 6,147,173 A | 11/2000 | Holtcamp .................. 526/133 |
| 6,180,732 B1 | 1/2001 | Ewen ................... 526/127 A |
| 6,180,735 B1 | 1/2001 | Wenzel .................... 526/142 |
| 6,207,606 B1 | 3/2001 | Lue et al. ................. 502/113 |
| 6,211,105 B1 | 4/2001 | Holtcamp .................. 502/103 |
| 6,242,545 B1 | 6/2001 | Jejelowo et al. ............. 526/160 |
| 6,245,705 B1 | 6/2001 | Kissin .................... 502/117 |
| 6,245,868 B1 | 6/2001 | Agapiou et al. ............... 526/88 |
| 6,248,845 B1 | 6/2001 | Loveday et al. ............. 526/113 |
| 6,271,323 B1 | 8/2001 | Loveday et al. ............. 526/161 |
| 6,274,684 B1 | 8/2001 | Loveday et al. ............. 526/114 |
| 6,300,436 B1 | 10/2001 | Agapiou et al. ............. 526/154 |
| 6,319,991 B1 * | 11/2001 | Okayama et al. ........... 525/240 |
| 6,339,134 B1 | 1/2002 | Crowther et al. ............ 526/128 |
| 6,340,730 B1 | 1/2002 | Murray et al. .............. 526/114 |
| 6,346,586 B1 | 2/2002 | Agapiou et al. ............. 526/160 |
| 6,359,072 B1 | 3/2002 | Whaley ................... 526/191 |
| 6,380,328 B1 | 4/2002 | McConville et al. ......... 526/119 |
| 6,420,580 B1 | 7/2002 | Holtcamp et al. ............. 556/11 |
| 6,576,306 B2 * | 6/2003 | Mehta et al. ............... 428/35.5 |
| 6,639,018 B2 * | 10/2003 | Yunoki et al. .............. 525/191 |
| 6,713,166 B2 * | 3/2004 | Yamamoto ................. 428/215 |
| 6,777,366 B2 | 8/2004 | Gauthier et al. ............ 502/117 |
| 6,777,367 B2 | 8/2004 | Gauthier et al. ............ 502/117 |
| 6,960,635 B2 * | 11/2005 | Stevens et al. ............. 526/161 |

FOREIGN PATENT DOCUMENTS

EP 0634421 A1 1/1995

(Continued)

OTHER PUBLICATIONS

JP 9-77930 (abstract and translation in English).*

(Continued)

Primary Examiner—Vasu Jagannathan
Assistant Examiner—Rip A. Lee
(74) Attorney, Agent, or Firm—Diane L. Kilpatrick-Lee

(57) ABSTRACT

A composition that may be useful for thermoforming and blow molding applications comprises a metallocene catalyzed propylene-ethylene random copolymer having an ethylene content of from about 0.1 to about 1.5 weight percent based on the copolymer, and exhibits a flexural modulus of at least about 1,100 MPa, a haze of less than about 40 percent, a melt flow of from about 1.0 dg/min to about 3.0 dg/min, and a xylene solubles content from about 0.2 weight percent to about 1.0 weight percent based on the copolymer. A process for preparing the copolymer and articles prepared therefrom are also disclosed. The composition's properties may make it particularly desirable for applications such as bottles, syringes and containers such as those used for food and medical purposes.

8 Claims, No Drawings

FOREIGN PATENT DOCUMENTS

| | | | |
|---|---|---|---|
| EP | 0794200 A2 | | 9/1997 |
| EP | 0802202 A1 | | 10/1997 |
| JP | 64-140 | * | 1/1989 |
| JP | 3-281647 | * | 12/1991 |
| JP | 4-198223 | * | 7/1992 |
| JP | 6-256602 | * | 9/1994 |
| JP | 9-77930 | * | 3/1997 |
| JP | 10-152596 | * | 6/1998 |
| WO | WO 02/051912 A1 | * | 7/2002 |

OTHER PUBLICATIONS

JP 10-152596 (abstract and translation in English).*
JP 6-256602 (abstract and translation in English).*

* cited by examiner

RANDOM COPOLYMERS AND FORMULATIONS USEFUL FOR THERMOFORMING AND BLOW MOLDING APPLICATIONS

CROSS REFERENCE TO RELATED APPLICATIONS

This application claims priority from the U.S. Provisional Patent Application having Ser. No. 60/633,789 and filed on Dec. 7, 2004.

BACKGROUND OF THE INVENTION

1. Technical Field

The invention relates to formulations and processes for random copolymers. More particularly, the invention relates to formulations and processes for preparing random copolymers having properties that may be particularly desirable for preparing thermoformed and blow molded articles.

2. Background of the Art

Propylene materials are among the most versatile and commonly used thermoplastics in the world today. Commercial grade polypropylenes are typically produced using either a Ziegler-Natta, succinate or metallocene catalyst mechanism in a polymerization process. Many industries, such as the packaging industry, utilize these polypropylene materials in various manufacturing processes, such as extrusion, injection molding, thermoforming and blow molding to create a variety of finished goods.

Within the packaging industry, there may be a number of unique applications that ideally require strong and substantially clear polymers. Medical articles, food storage containers, and other products that may readily be formed by thermoforming and blow molding techniques are used in various applications where they are in direct contact with blood or other bodily fluids, or with food or other items that are to be ingested or taken into the body. For these uses it may be desirable to use polymers having high clarity and strength and a very low extractables content.

Thermoforming and blow molding are two of the most rapidly growing technologies in rigid plastics processing. These manufacturing methods require certain desirable properties and characteristics of polymers to achieve better processibility. Traditionally, Ziegler-Natta catalyzed polypropylenes have been used in these applications because they may exhibit greater strength and stiffness in the finished product. However, it is generally known that other types of polypropylenes, such as the metallocene catalyzed polypropylenes, may exhibit lower extractables and higher clarity. Despite these advantages; however, thermoforming and blow molding of metallocene catalyzed polypropylenes have been generally avoided, because the metallocene polypropylenes also usually have a narrower molecular weight distribution and somewhat lower melt temperature than other available polymeric materials. These qualities are undesirable because they result in poor sag resistance.

Accordingly, it may be desirable in the art to discover a way to obtain, in a polypropylene, the advantages of relatively low extractables and relatively high clarity while avoiding or reducing the problems that are usually seen when metallocene catalyzed polypropylenes are employed in thermoformed and blow molded applications.

SUMMARY OF THE INVENTION

In one embodiment the invention is a composition that may be useful for thermoforming and blow molding applications. It includes a metallocene catalyzed propylene-ethylene random copolymer having an ethylene content of from about 0.1 to about 1.5 weight percent based on the copolymer. It may exhibit a flexural modulus of at least about 1,100 MPa, a haze of less than about 40 percent for a 40-mil thick sheet, a melt flow rate of from about 1.0 dg/min to about 3.5 dg/min, and a xylene solubles content from about 0.2 weight percent to about 1.0 weight percent based on the copolymer.

In another embodiment the invention is a process for preparing the metallocene catalyzed propylene-ethylene random copolymer, comprising contacting propylene and ethylene monomers and a metallocene catalyst under reaction conditions suitable to form the copolymer.

In still another embodiment, the invention is an article of manufacture prepared from the random copolymer.

DETAILED DESCRIPTION OF THE INVENTION

The invention solves the problems enumerated above by providing a random polypropylene copolymer that, when thermoformed or blow molded, may exhibit sufficient melt strength, also called sag resistance, relatively low extractables (also called xylene solubles) and relatively high clarity. Other desirable properties may include desirable levels of taste and odor resistance and stain resistance, and enhanced processability in thermoforming and blow molding applications. The random copolymer may be used alone or as the major component in a formulation that may contain minor amounts of additives such as thermal stabilizers, clarity-enhancing agents, and the like.

The random copolymer may be desirably a propylene-ethylene copolymer prepared from a propylene monomer and, incorporated therewith, from about 0.1 to about 1.5 weight percent ethylene based on the total copolymer. In some embodiments the ethylene may be desirably from about 0.5 to about 1.5 weight percent. The ethylene molecules may be inserted randomly into the polymer backbone between repeating propylene moieties, hence the name random copolymer.

To prepare the inventive random copolymers, a metallocene catalyst may be selected for the polymerization. In general, metallocene catalysts allow for better control of the crystalline structure of the copolymer, with the result that the copolymer may enjoy decreased isotacticity which, in turn, may result in enhanced clarity. Use of the metallocenes may also reduce molecular weight distribution which may also result in enhanced clarity by means of more uniform crystal size. Use of the metallocene catalyst may contribute to the relative reduction in the resulting xylene solubles content of the copolymer, which again contributes to improved clarity.

Metallocene catalysts may be characterized generally as coordination compounds incorporating one or more cyclopentadienyl (Cp) groups (which may be substituted or unsubstituted, each substitution being the same or different) coordinated with a transition metal through n bonding.

The Cp substituent groups may be linear, branched or cyclic hydrocarbyl radicals. The cyclic hdrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst may be a bulky ligand metallocene compound generally represented by the formula:

$$[L]_m M[A]_n$$

where L may be a bulky ligand, A may be a leaving group, M may be a transition metal and m and n are such that the total ligand valency corresponds to the transition metal valency. For example m may be from 1 to 3 and n may be from 1 to 3.

In one embodiment the metallocene catalyst may desirably be selected from the group termed the "CpFlu-type" catalysts. Particularly useful herein is the isospecific substituted CpFlu-type metallocene catalyst group. Such are frequently supported catalysts that comprise a metallocene catalyst component, an alkyl alumoxane cocatalyst component, and a particulate silica support. The metallocene catalyst incorporates a substituted cyclopentadienyl fluorenyl ligand structure and may be characterized by the formula $$X(CpR^1_{n1}R^2_m)(FlR^3_{n2})$$

wherein Cp may be a cyclopentadienyl group; Fl may be a fluorenyl group; X may be a structural bridge between Cp and Fl imparting stereorigidity to the metallocene; R1 may be a substituent on the cyclopentadienyl group; n1 may be 1 or 2; R2 may be a substituent on the cyclopentadienyl group at a position which may be proximal to the bridge; m may be 1 or 2; each R3 may be the same or different and may be a hydrocarbyl group having from 1 to 20 carbon atoms with R3 being substituted on a nonproximal position on the fluorenyl group and at least one other R3 being substituted at an opposed nonproximal position on the fluorenyl group; and n2 may be 2 or 4.

Where the catalyst is supported, the support may be silica having an average particle size from about 10 to about 50 microns and a surface area from about 200 to about 800 m$^2$/g or, in another embodiment, 300 to about 800 m$^2$/g. The support desirably has a pore volume from about 0.9 to about 2.1 milliliters per gram (ml/g). The metallocene component may be desirably supported on the silica support in an amount of at least about 1 weight percent of the combined amount of the silica and the alumoxane. Desirably, the metallocene component may be present on the silica support in an amount of at least about 1.5 weight percent. The alumoxane cocatalyst component may be incorporated onto the silica support to provide a weight ratio of alumoxane to silica of at least about 0.8:1 and desirably at least about 1:1. In one embodiment the catalyst may be a racemic-M$_2$Si(2M-PhInd)$_2$ZrCl$_2$ on 0.7/1 MAO on P10 silica, where M may be a transition metal selected from Groups 4, 5 or 6, Ph may be phenyl, and Ind may be indenyl. MAO may be methylalumoxane, the activator/cocatalyst.

Preparation of metallocene catalysts in general may be found described in, for example, U.S. Pat. No. 5,449,651, the disclosure of which is incorporated herein by reference. In general, the silica support material may be first impregnated with the activator or cocatalyst, such as methylalumoxane, in the given proportion, with at least half of the activator or co-catalyst being disposed within the internal pore volume of the silica. The silica may be then contacted with a dispersion of the metallocene catalyst in a hydrocarbon, desirably aromatic, solvent. The catalyst dispersion and silica which contains the activator or cocatalyst may then be mixed together at a temperature of about 10° C. or less, for a period of time sufficient to enable the metallocene to become reactively supported on the activator/cocatalyst-impregnated silica particles. This mixing time may vary from a few minutes to several hours. The supported catalyst may be then recovered from the hydrocarbon solvent and may be generally washed. The washing may be done in stages. An aromatic hydrocarbon solvent wash may be done first. Following this, an optional second wash may be carried out with a second aromatic hydrocarbon solvent to remove any unsupported metallocene from the supported catalyst. Finally, a paraffinic hydrocarbon wash may be done to remove remaining aromatic solvent from the supported catalyst. The washing procedures, like the mixing of the metallocene solvent dispersion and activator/cocatalyst-containing silica, may be desirably carried out at the relatively low temperature of about 10° C. or less. Following washing, the washed catalyst may be left undried, with the result that it may contain a substantial residue of the paraffinic hydrocarbon solvent.

Thereafter, the washed catalyst may be dispersed in a viscous mineral oil having a viscosity substantially greater than that of the paraffinic hydrocarbon solvent. Typically, the mineral oil has a viscosity, at 40° C., of at least about 65 centistokes as measured by ASTM D445. In contrast, the viscosity of the paraffinic hydrocarbon solvent may be less than about 1 centipoise at a temperature of about 10° C. This viscosity difference may remove most of the paraffinic hydrocarbon solvent.

The final catalyst dispersion desirably may have a significant metal loading measured as weight percent in the dispersion. In one embodiment this metal loading may be from about 0.5 to about 6 weight percent. In another embodiment this metal loading may be from about 1 to about 3 weight percent, and in still another embodiment this metal loading may be about 2 weight percent in the dispersion.

Those skilled in the art will appreciate that a variety of modifications in the above generalized catalyst preparation method may be made without significantly altering the outcome. For example, the metallocene used with the invention may be selected from any known metallocene catalysts useful for olefin preparation. Metallocene catalysts may be characterized generally as coordination compounds incorporating one or more cyclopentadienyl (Cp) groups (which may be substituted or unsubstituted, each substitution being the same or different) coordinated with a transition metal through n bonding. The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as C$_1$ to C$_{20}$ hydrocarbyl radicals.

A specific example of a metallocene catalyst is a bulky ligand metallocene compound generally represented by the formula:

$$[L]_mM[A]_n \qquad \text{Formula II}$$

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound may be selected from Groups 3 through 12 atoms and lanthanide Group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The Cp group typically includes fused ring(s) and/or substituted ring or fused ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls, optionally containing halogens such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two alkyl groups, two adjacent alkyl groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent alkyl group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. In catalysts where there are two L groups, they may be bridged to each other. A bridged metallocene, for example may, be described by the general formula:

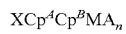    FORMULA III wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, —$Si(R)_2Si(R_2)$—, $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl. The bridging groups may also have carbons or silicons having an olefinic substituent.

In another exemplary catalyst, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The metallocene catalysts also includes the CpFlu family of catalysts (e.g., a metallocene incorporating a substituted Cp fluorenyl ligand structure) represented by the following formula:

$$X(CpR^1_n R^2_m)(Flu^3_p)$$  Formula IV wherein Cp is a cyclopentadienyl group, Fl is a fluorenyl group, X is a structural bridge between Cp and Flu, $R^1$ is a substituent on the Cp, n is 1 or 2, $R^2$ is a substituent on the Cp at a position which is proximal to the bridge, m is 1 or 2, each $R^3$ is the same or different and is a hydrogen or a hydrocarbyl group having from 1 to 20 carbon atoms with $R^3$ being substituted on a nonproximal position on the fluorenyl group and at least one other $R^3$ being substituted at an opposed nonproximal position on the fluorenyl group and p is 2 or 4.

Another family of the metallocene catalyst includes bridged mono-ligand metallocene compounds (e.g., mono cyclopentadienyl catalyst components). In this embodiment, at least one metallocene catalyst component is a bridged "half-sandwich" metallocene catalyst. In yet another aspect of the invention, the at least one metallocene catalyst component is an unbridged "half sandwich" metallocene. The "half sandwich" metallocenes above are alternatively and further described in U.S. Pat. Nos. 6,069,213, 5,026,798, 5,703,187, and 5,747,406, including a dimer or oligomeric structure, such as disclosed in, for example, U.S. Pat. Nos. 5,026,798 and 6,069,213, which are incorporated by reference herein.

Non-limiting examples of metallocene catalyst components include:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fluorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
mesoethylenebis(1-indenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$, dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyl)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecylcyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bisnoxtylcyclopentadienylzirconium$A_n$,
bis(n-pentylcyclopentadienyl)zirconium$A_n$,
bis(n-propylcyclopentadienyl)zirconium$A_n$,
bistrimethylsilylcyclopentadienylzirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycloundecylamidotitanium$A_n$,
dimethylsilyltetramethylcyclopentadienylcyclododecylamidotitanium$A_n$,
dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$,
methylphenylsilyltetramethylcyclopentadienylcycloheptylamidotitanium$A_n$,
methylphenylsilyltetramethylcyclopentadienylcyclooctylamidotitanium$A_n$,
methylphenylsilyltetramethylcyclopentadienylcyclononylamidotitanium$A_n$,
methylphenylsilyltetramethylcyclopentadienylcyclodecylamidotitanium$A_n$,
methylphenylsilyltetramethylcyclopentadienylcycloundecylamidotitanium$A_n$,
methylphenylsilyltetramethylcyclopentadienylcyclododecylamidotitanium$A_n$,
methylphenylsilyl(tetramethylcyclopentadienyl)(sec-butylamido)titanium$A_n$,
methylphenylsilyl(tetramethylcyclopentadienyl)(n-octylamido)titanium$A_n$,
methylphenylsilyl(tetramethylcyclopentadienyl)(n-decylamido)titanium$A_n$,
methylphenylsilyl(tetramethylcyclopentadienyl)(n-octadecylamido)titanium$A_n$,
diphenylsilyltetramethylcyclopentadienylcyclopropylamidotitanium$A_n$,
diphenylsilyltetramethylcyclopentadienylcyclobutylamidotitanium$A_n$,
diphenyisilyltetramethylcyclopentadienylcyclopentylamidotitanium$A_n$,
diphenylsilyltetramethylcyclopentadienylcyclohexylamidotitanium$A_n$, diphenylsilyltetramethylcyc-
lopentadienylcycloheptylamidotitanium$A_n$,
diphenylsilyltetramethylcyc-
lopentadienylcyclooctylamidotitanium$A_n$,
diphenylsilyltetramethylcyc-
lopentadienylcyclononylamidotitanium$A_n$,
diphenylsilyltetramethylcyc-
lopentadienylcyclodecylamidotitanium$A_n$,
diphenylsilyltetramethylcyc-
lopentadienylcycloundecylamidotitanium$A_n$,
diphenylsilyltetramethylcyc-
lopentadienylcyclododecylamidotitanium$A_n$,
diphenylsilyl(tetramethylcyclopentadienyl)(sec-butyla-
mido)titanium$A_n$,
diphenylsilyl(tetramethylcyclopentadienyl)(n-octylamido)
titanium$A_n$,
diphenylsilyl(tetramethylcyclopentadienyl)(n-decylamido)
titanium$A_n$,
diphenylsilyl(tetramethylcyclopentadienyl)(n-octadecyla-
mido)titanium$A_n$, and derivatives thereof.

Metallocene catalysts may be supported or unsupported. Typical support materials may include talc, inorganic oxides, clays and clay minerals, ion-exchanged layered compounds, diatomaceous earth compounds, zeolites or a resinous support material, such as a polyolefin. Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 $m^2$/g to 1,000 $m^2$/g, or from 100 $m^2$/g to 400 $m^2$/g, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is incorporated by reference herein. The methods generally include reacting neutral anion precursors that are sufficiently strong Lewis acids with the hydroxyl reactive functionalities present on the silica surface such that the Lewis acid becomes covalently bound. Activators may also be incorporated onto the support, using processes such as those disclosed in, for example, U.S. Pat. Nos. 6,777,366 and 6,777,367, both to Gauthier, et al., and incorporated herein by reference.

To prepare a polymer it is necessary, in general, to contact the monomer or mixture of monomers and the given metallocene catalyst and the described cocatalyst(s). In certain cases it is desirable that the catalyst has been preactivated. Those skilled in the art will understand that this refers to subjecting the metallocene catalyst to conditions that promote the desired interaction between the activator or cocatalyst and the metallocene. The most commonly employed method of activating a catalyst is simply heating it to a sufficient temperature and for a sufficient time, determined as a matter of routine experimentation. This is discussed further in, for example, U.S. Pat. No. 6,180,732, the disclosure of which is incorporated herein by reference. Other methods can be used. Those skilled in the art will appreciate that modifications in the above generalized preparation method may be made without altering the outcome. Therefore, it will be understood that additional description of methods and means of preparing the catalyst are outside of the scope of the invention, and that it is only the identification of the prepared catalysts, as defined herein, that is necessarily described herein.

The metallocene catalysts described herein may be used to make homopolymers, copolymers and terpolymers using monomers including ethylene and/or propylene. A variety of processes may be employed to prepare the polymers. Among the varying approaches that may be used include procedures set forth in, for example, U.S. Pat. No. 5,525,678, which is incorporated herein by reference. The equipment, process conditions, reactants, additives and other materials will, of course, vary in a given process, depending on the desired composition and properties of the polymer being formed. For example, the processes discussed in any of the following patents may be useful, each of which is incorporated herein by reference: U.S. Pat. Nos. 6,420,580 6,380,328 6,359,072 6,346,586 6,340,730 6,339,134 6,300,436 6,274,684 6,271,323 6,248,845 6,245,868 6,245,705 6,242,545 6,211,105 6,207,606 6,180,735 and 6,147,173.

The catalyst systems described herein may be used over a wide range of temperatures and pressures. The temperatures may be in the range of from about 20° C. to about 280° C., or from about 50° C. to about 200° C. and the pressures employed may be in the range of from 1 atmosphere to about 500 atmospheres or higher. In general the temperatures, as well as other polymerization conditions including, for example, pressures, are frequently those at which previously employed cocatalysts, such as TIBAI and/or TEAI, tend to form species which are soluble in the polymerization diluent. It is this ability to offer production improvements under the same or similar production conditions that is an important advantage of using the invention. Such polymerization processes include solution, bulk, gas phase, slurry phase, high pressure processes, and combinations thereof.

Examples of solution processes are described in U.S. Pat. Nos. 4,271,060 5,001,205 5,236,998 and 5,589,555 and are incorporated herein by reference.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See, for example, U.S. Pat. Nos. 4,543,399 4,588,790 5,028,670 5,317,036 5,352,749 5,405,922 5,436,304 5,456,471 5,462,999 5,616,661 and 5,668,228

The reactor pressure in a gas phase process may vary from about 100 psig to about 500 psig, or from about 200 to about 400 psig, or from about 250 to about 350 psig. The reactor temperature in a gas phase process may vary from 30° C. to 120° C. or 60° C. to 115° C. or 70° C. to 110° C. or 70° C. to 95° C.

Other gas phase processes contemplated by the process includes those described in U.S. Pat. Nos. 5,627,242 5,665,818 and 5,677,375 and European publications EP-A-0 794 200 EP-A-0 802 202 and EP-B-634 421 all of which are incorporated herein by reference.

Slurry processes generally include forming a suspension of solid, particulate polymer in a liquid polymerization medium, to which monomers and optionally hydrogen, along with catalyst, are added. The suspension, including the polymerization diluent, may be intermittently or continuously removed from the reactor where the volatile components may be separated from the polymer and recycled, optionally after a distillation, to the reactor. The liquefied diluent employed in the polymerization medium is typically an alkane having from 3 to 7 carbon atoms, preferably a branched alkane. The medium employed should be liquid under the conditions of polymerization and relatively inert, such as hexane or, in one particularly desirable embodiment, isobutane.

The catalyst as a slurry or as a dry free flowing powder may be injected regularly to the reactor loop, which can itself be filled with circulating slurry of growing polymer particles in a monomer. Hydrogen, optionally, may be added as a molecular weight control. The reactor may be maintained at a pressure of from about 27 bar (2.7 mPa) to about 45 bar (4.5 mPa) (and a temperature of from about 38° C. to about 121° C. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of unreacted monomer and comonomers. The resulted hydrocarbon free powder can then be compounded for use in various applications. Alternatively, other types of slurry polymerization processes can be used, such stirred reactors is series, parallel or combinations thereof.

A slurry and/or polymerization process generally includes pressures in the range of 1 to 50 atmospheres (0.10 to 5.06 mPa) and even greater and temperatures of from about 0° C. to about 120° C.

Therefore, in view of the wide range of metallocene catalysts in use in the art, it will be understood that additional description of methods and means of preparing the catalyst are outside of the scope of the invention, and that it may be only the identification of metallocenes as the required catalysts that may be necessarily described herein.

Once the catalyst has been thus obtained, it may be used to prepare the inventive random copolymers in any polymerization protocol that may be typically or conventionally used or known in the art. Copolymer polymerizations may be carried out in, for example, loop, slurry, continuous stirred tank, or other types of polymerization reactors which enable introduction and appropriate mixing of monomer feedstocks. Reaction conditions, including time, temperature, pressure, and residence profile, may be any known or used in the art. Agitation or mixing may be accomplished using any conventional stirring or circulating means to ensure appropriate contact between the monomers and the catalyst.

Following such conventional polymerization to form the propylene-ethylene random copolymer, the random copolymer may be admixed with other formulation components to prepare a formulated composition, also called a formulation, that may be particularly useful for thermoforming and blow molding applications.

One potential formulation component may be a thermal stabilizer. Such an additive helps to protect the random copolymer from degradation due to exposure to excessive temperatures. Examples of such include, but are not limited to, pentaerythritol tetrakis(3,5-di-tert-butyl-4-hydroxyhydrocinnamate), which is commercially available from Ciba Specialty Chemicals Corporation under the tradname CIBA™ IRGANOX™ 1010, and tris(2,4-di-tert-butylphenyl)phosphite, which is commercially available from the same company under the tradename CIBA™ IRGAFOS™ 168. Modified calcium salts derived from stearic and lactic acids may also be employed for purposes of thermal stability, and may include the products called PATIONIC™ 940 and PATIONIC™ 1052, available from American Ingredients Company. Other suitable thermal stabilizers known or used in the art may also or alternatively be selected.

The thermal stabilizer, or combinations of thermal stabilizers, may be desirably employed in a formulation with the inventive random copolymer in an amount from about 400 ppm to about 1500 ppm, more desirably from about 500 ppm to about 1200 ppm, based on the copolymer.

Also includable in a formulation with the inventive random copolymer may be a clarity-enhancing agent. Clarity-enhancing agents may enhance the aesthetic appeal of the formed product by making it more transparent, and may be selected from two sub-groups known as nucleators and clarifiers. They may serve to speed production cycles and operate by nucleating the polymer crystals and increasing the rate of crystal formation in the copolymer, both of which may result in decreased average crystal size. Smaller crystals may scatter less light, which increases the clarity of the copolymer.

One or more clarity-enhancing agents may be selected from a variety of suitable materials that are known or used in the art. Among those categorized as clarifiers are commercially available materials sold by Milliken Chemical under the trade name MILLAD™. One such product is MILLAD™ 3988, a powdered sorbitol product. Derivatives of dibenzylidene sorbitol may be frequently employed. Other examples include IRGACLEAR™ DM-LO from Ciba Specialty Chemicals, and ADK NA-21, an organophosphate material available from Amfine Chemical. Nucleators may include ADK Na-11 and ADK Na-21 from Amfine Chemical. Nucleators may be most commonly aromatic carboxylic acid salts such as sodium benzoate. Combinations of these and/or of other clarity-enhancing agents may be used in the invention, and may be desirably selected in part for their ability to dissolve in the copolymer at applicable temperatures.

Where a clarifier is selected as the clarity-enhancing agent or as a portion thereof, its amount in the inventive formulation is, in one embodiment, desirably from about 500 ppm to about 3,500 ppm, based on the random copolymer. In another embodiment it may be desirably from about 1,500 ppm to about 3,500 ppm. In yet another embodiment it may be desirably from about 1,700 ppm to about 3,500 ppm. These ppm figures translate to a level based on weight percentages of from about 0.10 weight percent to about 0.35 weight percent in the random copolymer.

Where a nucleator is selected as the clarity-enhancing agent or as a portion thereof, its amount in the inventive formulation is, in one embodiment, desirably from about 0.0001 to about 1 weight percent. In another embodiment its amount may be from about 0.01 to about 0.5 weight percent. In still another embodiment its amount may be from about 0.01 to about 0.3 weight percent, based on the random copolymer.

It will be appreciated that additional formulation components may be included, desirably provided that such do not sufficiently alter the characteristics of the formulation such that it may be no longer suitable for effective thermoforming or blow molding and/or no longer attains the remarkable and desirable properties claimed herein. These formulation components may include, for example, additives to improve extrusion processing, such as fluoropolymers; ultra-violet light stabilizers; oxidants or anti-oxidants; anti-static agents; fire retardants; processing oils; mold release agents; coloring agents including pigments and dyes; fillers; combinations thereof; and the like.

The clarity-enhancing agent or combination of agents, and/or the thermal stabilizer or combination of stabilizers, and/or any other selected formulation components may be admixed with the random copolymer via any protocol and means known or used in the art. For example, in one embodiment the additive materials may be added to the random copolymer which may be in the form of a powder or fluff, i.e., in the form in which it has been retrieved from the polymerization reactor. Admixing may be done using a Banbury™ mixer or any other conventionally known or used means or method of maximizing contact between all of the formulation components. Such may include solution blending, solid state physical admixture, molten state admixture as a part of pelletization, extrusion admixture during formation of a finished article, roll milling, screw extrusion, and the like. Where molten phase admixture is selected, such may be desirably carried out at a temperature from about 140° C. to about 270° C. Those skilled in the art will be aware that convenience may be balanced against obtaining a desired uniformity of the blend.

In some embodiments the random copolymer may exhibit certain particularly desirable properties. As noted hereinabove, haze may be desirably less than about 40 percent, or less than about 30 percent, or even less than about 25 percent, for a 40 mil sheet. Elongation at yield may be from about 12 to about 15 percent. Melt flow may be from about 1.0 to about 3.5 dg/min, and in some embodiments may be from about 2.0 to about 3.5 dg/min.

Because of its advantageous properties, the final formulation may be highly desirable for preparing end use articles of manufacture via methods including thermoforming and blow molding, and may also be useful for preparing articles via methods including injection molding, sheet extrusion and the like, either in lieu of or in cooperation with a thermoforming or blow molding operation. Using these methods a variety of types of articles may be prepared. These articles include, in particular, hollow articles such as bottles and syringes, which may be typically blow-molded, and articles that may be thermoformed from sheets. In these and other applications the desirable sag resistance, as shown by the flexural modulus, melt strength, elongation viscosity, and temperature dependent flexural modulus of the copolymer composition, enables convenient production of the articles.

The metallocene catalyzed random ethylene-propylene copolymers, and formulations including these copolymers, having been generally described, the following examples are given as particular embodiments of the polymeric material disclosed, and to demonstrate the practice and some of the advantages thereof. It is understood that the examples are given by way of illustration and are not intended to limit the specification or the claims to follow in any manner. It is further understood that modifications and alterations may be made to the random copolymers or the process of their preparation or the article prepared therefrom, such as, for example, selection of ethylene levels, preparation or processing conditions, metallocene catalyst compositions, formulation components, copolymer properties, or the identification of end use articles, not explicitly disclosed hereinabove but falling within the general description provided, without departing from the scope of this invention.

EXAMPLES

Example 1

A metallocene catalyzed propylene-ethylene random copolymer is prepared using a racemic-$M_2Si(2M-PhInd)_2ZrCl_2$ on 0.7/1 MAO on P10 silica catalyst. The ethylene content of the random copolymer is about 0.13 percent based on the weight of the copolymer as a whole. This random copolymer is then combined with about 2550 ppm of MILLAD™ 3988 clarifier, an additive package including IRGANOX™ 1010 and IRGAFOS™ 168, and about 500 ppm of a copolymer extrusion promoter labeled VITON FREE FLOW™ (VFF), a fluoropolymer available from DuPont-Dow Chemical. See Table 1 for additional formulation information. The formulation is tested for melt flow rate and xylene solubles. It is found to have a melt flow rate of about 2.1 dg/min, and a xylene solubles content of about 0.3 percent by weight of the copolymer.

Example 2

A metallocene catalyzed propylene-ethylene random copolymer is prepared using the same materials and reaction conditions as in Example 1, except that the ethylene content of the final copolymer is about 1.5 weight percent and about 2920 ppm of the MILLAD™ 3988 is used. Also included is an additive package similar to that of Example 1. See Table 1 for additional formulation information. The resulting copolymer has a melt flow rate of about 3.5 dg/min and a xylene solubles content of about 0.5 percent by weight of the copolymer.

Example 3 (Comparative)

A comparative polypropylene homopolymer is prepared using a standard Ziegler-Natta catalyst. It includes about 1900 ppm of the MILLAD™ 3988 clarifier. See Table 1 for additional formulation information. For this homopolymer the melt flow rate is about 1.8 dg/min and the xylene solubles content is about 3.7 percent by weight of the homopolymer.

Example 4 (Comparative)

A comparative propylene-ethylene random copolymer is prepared using a standard Ziegler-Natta catalyst. It has an ethylene content of about 1.9 percent by weight of the copolymer, and about 2010 ppm of the MILLAD™ 3988 clarifier. See Table 1 for additional formulation information. For this copolymer the melt flow rate is about 1.7 dg/min and the xylene solubles content is about 4.2 percent by weight of the copolymer.

Example 5 (Comparative)

Extruded sheets are prepared using the polymers prepared in Examples 1-4. Each sheet is 40-mil in thickness. The sheets are tested for haze. The results are shown in Table 1, which also includes the overall formulation information and other data relative to Examples 1-4 for convenient visual comparison.

TABLE 1

|  | Example 1 | Example 2 | Example 3 (Comparative-homopolymer) | Example 4 (Comparative-homopolymer) |
|---|---|---|---|---|
| Catalyst | Metallocene | Metallocene | Ziegler-Natta | Ziegler-Natta |
| Melt Flow Rate, dg/10 min | 2.1 | 3.5 | 1.8 | 1.7 |
| Ethylene, wt % | 0.13 | 1.50 | 0.00 | 1.90 |
| Xylene solubles, wt % | 0.3 | 0.5 | 3.7 | 4.2 |
| IRGANOX ™ 1010, wt % | 0.026 | 0.034 | 0.041 | 0.040 |
| MILLAD ™ 3988, wt % | 0.255 | 0.292 | 0.189 | 0.201 |
| IRGAFOS ™ 168, wt % | 0.133 | 0.147 | 0.122 | 0.126 |
| PATIONIC ™ 1052, wt % | none | 0.101 | none | 0.088 |
| VFF, wt % | 0.032 | 0.051 | none | none |
| Calcium stearate, wt % | none | none | none | 0.094 |
| % Haze, 40 mil sheet | 35.5 | 23.5 | 39.9 | 26.0 |

Example 6 (Comparative)

The polymers prepared in Examples 1-4 are used to prepare injection molded samples of varying thickness using standard injection molding procedures. The samples are used for physical properties testing, the results of which are shown in Table 2.

TABLE 2

|  | Example 1 | Example 2 | Example 3 (Comparative-homopolymer) | Example 4 (Comparative-homopolymer) |
|---|---|---|---|---|
| Flexural Modulus (Chord 4-8N), MPa | 1516 | 1102 | 1585 | 1102 |
| Tensile modulus, MPa | 1378 | 1171 | 1378 | 1102 |
| Tensile strength at yield, psi | 4900 | 4300 | 5100 | 4300 |
| Tensile strength at break, psi | 3100 | 2700 | 3200 | 3000 |
| Elongation at yield, % | 12.3 | 14.4 | 14.2 | 17 |
| Elongation at break, % | >72 | >72 | 57 | >71 |
| Heat distortion temperature, ° C. | 88 | 80 | 89 | 75 |
| Melt temperature, ° C. | 149 | 140 | 163 | 145 |
| ⅛ inch plaque: | | | | |
| Color L, plaque | 76.2 | 76.8 | 77.2 | 76.7 |
| Color a, plaque | −1.1 | −0.7 | −1.1 | −0.9 |
| Color b, plaque | 0.8 | 1.3 | 0.0 | 0.4 |
| Yellowness index | 0.9 | 2.4 | −1.0 | 0.0 |

Example 7

Sample food containers are prepared via a conventional thermoforming process using the random copolymer of Example 1 and the polypropylene homopolymer of Example 3. The containers are tested for sidewall and bottom haze at an average thickness of about 40 mils, with the results shown in Table 3.

TABLE 3

|  | Example 1 | Example 3 (Comparative-homopolymer) |
|---|---|---|
| Haze, sidewall, % | 15 | 31 |
| Haze, bottom, % | 32 | 44 |
| Mass, grams | 28 | 31 |

What is claimed is:

1. A composition consisting essentially of a metallocene catalyzed propylene-ethylene random copolymer having an ethylene content of from 0.1 to 1.5 weight percent based on the copolymer, wherein said composition has a flexural modulus, determined by ASTM D-790, of at least about 1,100 MPa, a haze of from about 23.5 percent to about 40 percent for a 40-mil thick sheet, a melt flow, determined by ASTM D-1238, of from about 1.0 dg/min to about 3.5 dg/min, a melting point of from 140° C. to 149° C. and a xylene solubles content at the boiling point of xylene from about 0.2 weight percent to about 1.0 weight percent based on the copolymer.

2. The composition of claim 1 wherein the ethylene content is from 0.5 to 1.5 weight percent based on the copolymer.

3. The composition of claim 1 wherein the copolymer has an elongation at yield from about 12 to about 15 percent.

4. The composition of claim 1 further comprising one or more additives selected from the group consisting of clarity-enhancing agents; thermal stabilizers; extrusion processing aids; ultra-violet light stabilizers; oxidants or anti-oxidants; anti-static agents; fire retardants; processing oils; mold release agents; coloring agents including pigments and dyes; fillers; and combinations thereof.

5. The composition of claim 4 wherein the clarity-enhancing agent is selected from the group consisting of clarifiers and nucleators.

6. The composition of claim 5 wherein the clarifier is in the amount of from about 0.10 to about 0.35 weight percent based on the copolymer.

7. The composition of claim 5 wherein the nucleator is in the amount from about 0.0001 to about 1 weight percent based on the copolymer.

8. The composition of claim 4 wherein the thermal stabilizer is in the amount from about 400 to about 1500 ppm based on the copolymer.

* * * * *